United States Patent
Jota et al.

(10) Patent No.: US 11,445,115 B2
(45) Date of Patent: Sep. 13, 2022

(54) IMAGE CAPTURING AND STABILIZATION APPARATUS AND METHOD CAPABLE OF PERFORMING IMAGE STABILIZATION CONTROL BY MOVING AN IMAGE SENSOR

(71) Applicant: CANON KABUSHIKI KAISHA, Tokyo (JP)

(72) Inventors: Yusuke Jota, Kanagawa (JP); Takeshi Omata, Kanagawa (JP); Kenya Fukabori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/082,966

(22) Filed: Oct. 28, 2020

(65) Prior Publication Data

US 2021/0136289 A1    May 6, 2021

(30) Foreign Application Priority Data

Oct. 30, 2019 (JP) .............................. JP2019-197650
Mar. 17, 2020 (JP) .............................. JP2020-046838

(51) Int. Cl.
*H04N 5/232* (2006.01)

(52) U.S. Cl.
CPC ..... *H04N 5/23287* (2013.01); *H04N 5/23245* (2013.01); *H04N 5/23254* (2013.01)

(58) Field of Classification Search
CPC ........... H04N 5/23287; H04N 5/23245; H04N 5/23254; H04N 5/23258
See application file for complete search history.

(56) References Cited

U.S. PATENT DOCUMENTS

| | | | | |
|---|---|---|---|---|
| 2007/0097219 A1* | 5/2007 | Nomura | ............. | H04N 5/23258 348/208.7 |
| 2010/0202765 A1* | 8/2010 | Ohishi | ............... | H04N 5/23258 396/55 |
| 2019/0141246 A1* | 5/2019 | Sugita | .................... | G03B 13/22 |
| 2019/0230287 A1* | 7/2019 | Shingu | ............... | H04N 5/23258 |
| 2020/0077024 A1* | 3/2020 | Sudo | .................. | H04N 5/23258 |
| 2020/0329199 A1* | 10/2020 | Nomura | ............. | H04N 5/23287 |

FOREIGN PATENT DOCUMENTS

JP     2019-087937 A     6/2019

* cited by examiner

*Primary Examiner* — Padma Haliyur
(74) *Attorney, Agent, or Firm* — Cowan, Liebowitz & Latman, P.C.

(57) ABSTRACT

An image stabilization apparatus comprising a calculation unit that calculates a driving amount for moving an image sensor so as to compensate for shake, an image stabilization control unit that controls image stabilization by moving the image sensor based on the calculated driving amount, a determination unit that determines whether a current state is a first state according to an image shooting state, and a control unit that controls a shift amount of a center position of image stabilization control so as to be smaller in a case where a center position of the image circle of a lens apparatus is moved from a first position to a second position and the first state is determined than in a case where the center position is moved from the first position to the second position and the first state is not determined.

20 Claims, 9 Drawing Sheets

| FIRST PRIORITY STATE | SECOND PRIORITY STATE | THIRD PRIORITY STATE |
|---|---|---|
| $\beta_1$ | $\beta_2$ | $\beta_3$ |
| 0 | 0.25 | 0.50 |

| FIRST PRIORITY STATE | SECOND PRIORITY STATE | THIRD PRIORITY STATE | FOURTH PRIORITY STATE | FIFTH PRIORITY STATE |
|---|---|---|---|---|
| $\beta_1$ | $\beta_2$ | $\beta_3$ | $\beta_4$ | $\beta_5$ |
| 0 | 0.25 | 0.50 | 0 | 0 |

FIG. 12

IMAGE CAPTURING AND STABILIZATION APPARATUS AND METHOD CAPABLE OF PERFORMING IMAGE STABILIZATION CONTROL BY MOVING AN IMAGE SENSOR

BACKGROUND OF THE INVENTION

Field of the Invention

The present invention relates to an image stabilization apparatus and method, and an image capturing apparatus and, more specifically to, an image stabilization apparatus and method, and an image capturing apparatus that realizes an image stabilization function by shifting an image sensor.

Description of the Related Art

In recent years, in image capturing apparatuses such as digital cameras and video cameras, various types of image stabilization functions have been proposed to correct shake and the like applied to the image capturing apparatus. With this image stabilization function, it became possible to capture an image with better image quality. Some image stabilization functions in such image capturing apparatuses reduce image blur by shifting an image sensor for sensing a subject image with respect to the optical axis of an imaging optical system. However, in interchangeable lens type cameras, there may be cases that the diameter of the image circle of an attached interchangeable lens does not have a sufficient margin with respect to the size of the image sensor, the center of the image circle is displaced from the center of the image sensor due to manufacturing errors of the interchangeable lens, and so forth. In such cases, it is not possible to secure a shift amount of the image sensor necessary for performing good image stabilization.

Japanese Patent Laid-Open No. 2019-87937 discloses a method in which information about the center position of the image circle of an interchangeable lens (lens optical axis information) is sent to a camera by communication and an image sensor is shifted in the camera so that the center of the image sensor and the optical axis of the lens match. According to this method, it is possible to eliminate the deviation of the optical axis of the lens due to manufacturing errors or the like, and it is possible to secure an amount of movement of the image sensor necessary for image stabilization to a certain extent.

However, in the method disclosed in Japanese Patent Laid-Open No. 2019-87937, depending on the shooting state of the camera, an area shot by the camera may change against the user's intention by shifting the image sensor, and an image may be shot with an unintended composition. For example, if the image sensor is shifted when the camera is attached to a tripod or while a time-lapse moving image is shot, the area shot by the camera may change regardless of the user's shooting intention, and the obtained image may have an unintended composition.

SUMMARY OF THE INVENTION

The present invention has been made in consideration of the above situation, and while making effective use of the correction range of image stabilization, performs image stabilization control suitable to a shooting situation.

According to the present invention, provided is an image stabilization apparatus comprising: a calculation unit that calculates a driving amount for moving an image sensor so as to compensate for shake; an image stabilization control unit that controls image stabilization by moving the image sensor based on the driving amount calculated by the calculation unit; a determination unit that determines whether a current state is a first state according to an image shooting state; and a control unit that controls a center position of image stabilization control based on a center position of an image circle of a lens apparatus attached to an image capturing apparatus having the image sensor, wherein the control unit controls a shift amount of the center position of the image stabilization control so as to be smaller in a case where the center position of the image circle is moved from a first position to a second position and the current state is determined to be the first state by the determination unit than in a case where the center position of the image circle is moved from the first position to the second position and the current state is determined to be not the first state by the determination unit, wherein each unit is implemented by one or more processors, circuitry or a combination thereof.

Further, according to the present invention, provided is an image capturing apparatus to which a lens apparatus is attached, comprising: an image sensor that performs photoelectric conversion on a subject image formed by the lens apparatus and outputs an image signal; a driving unit that drives the image sensor according to a driving amount for compensating shake; and an image stabilization apparatus comprising: a calculation unit that calculates the driving amount; an image stabilization control unit that controls image stabilization by controlling the driving unit based on the driving amount calculated by the calculation unit; a determination unit that determines whether a current state is a first state according to an image shooting state; and a control unit that controls a center position of image stabilization control based on a center position of an image circle of the lens, wherein the control unit controls a shift amount of the center position of the image stabilization control so as to be smaller in a case where the center position of the image circle is moved from a first position to a second position and the current state is determined to be the first state by the determination unit than in a case where the center position of the image circle is moved from the first position to the second position and the current state is determined to be not the first state by the determination unit, wherein each unit is implemented by one or more processors, circuitry or a combination thereof.

Furthermore, according to the present invention, provided is an image stabilization method comprising: calculating a driving amount for moving an image sensor so as to compensate for shake; controlling image stabilization by moving the image sensor based on the driving amount calculated by the calculation unit; determining whether a current state is a first state according to an image shooting state; and controlling a center position of image stabilization control based on a center position of an image circle of a lens apparatus attached to an image capturing apparatus having the image sensor, wherein a shift amount of the center position of the image stabilization control is controlled so as to be smaller in a case where the center position of the image circle is moved from a first position to a second position and the current state is determined to be the first state than in a case where the center position of the image circle is moved from the first position to the second position and the current state is determined to be not the first state.

Further, according to the present invention, provided is a non-transitory computer-readable storage medium, the storage medium storing a program that is executable by the computer, wherein the program includes program code for causing the computer to function as an image stabilization apparatus comprising: a calculation unit that calculates a driving amount for moving an image sensor so as to compensate for shake; an image stabilization control unit that controls image stabilization by moving the image sensor based on the driving amount calculated by the calculation unit; a determination unit that determines whether a current state is a first state according to an image shooting state; and a control unit that controls a center position of image stabilization control based on a center position of an image circle of a lens apparatus attached to an image capturing apparatus having the image sensor, wherein the control unit controls a shift amount of the center position of the image stabilization control is smaller in a case where the center position of the image circle is moved from a first position to a second position and the current state is determined to be the first state is determined than in a case where the center position of the image circle is moved from the first position to the second position and the current state is determined to be not the first state.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
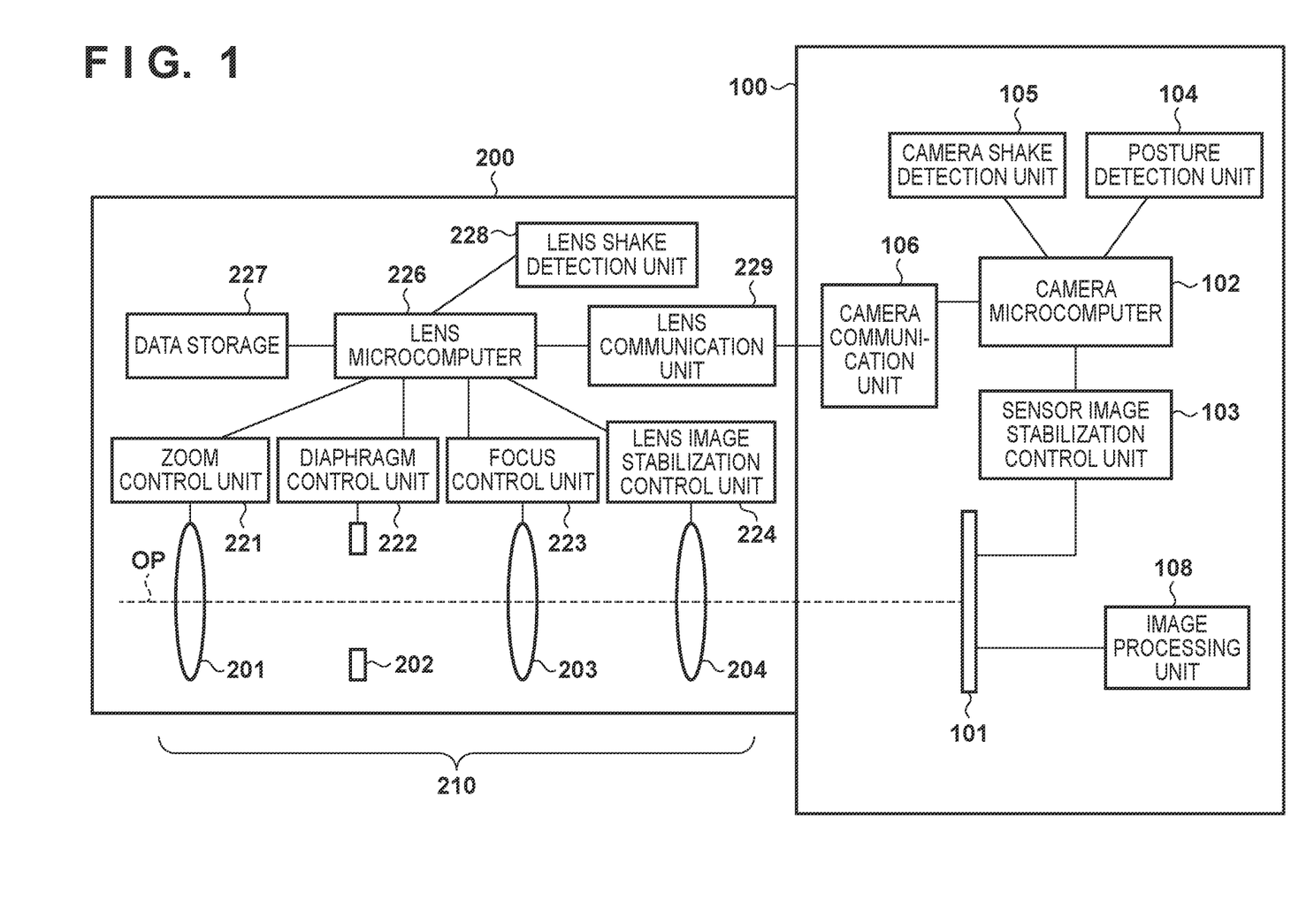
FIG. 1 is a block diagram showing a schematic configuration of an image capturing system according to a first embodiment of the present invention.

FIG. 1 is a block diagram showing a schematic configuration of an image capturing system according to a first embodiment. The image capturing system invention includes a camera body 100 and an imaging lens device (referred to as "an interchangeable lens", hereinafter) 200 that is attachable to and detachable from the camera body 100. The camera body 100 may be a still camera or a video camera.

In the camera body 100, an image sensor 101 senses (photoelectrically converts) an image of a subject formed by an imaging optical system 210 included in the interchangeable lens 200. An output signal (image signal) from the image sensor 101 is input to an image processing unit 108. The image processing unit 108 performs various kinds of image processing on the image signal to generate image data. The image data is displayed on a monitor (not shown) or recorded on a recording medium (not shown).

The image sensor 101 can be moved in a direction intersecting an optical axis OP of the imaging optical system 210 by a shifting mechanism described later. For example, the image sensor 101 can shift in a plane orthogonal to the optical axis OP or rotate about the optical axis OP in the plane orthogonal to the optical axis OP. In the following description, the case where the image sensor 101 is shifted will be mainly described.

A camera shake detection unit 105 detects a shake of the camera body 100 (hereinafter, referred to as "camera shake") caused by a user's hand shake or the like, and outputs a camera shake detection signal indicating the camera shake to a camera microcomputer 102. The camera microcomputer 102 has a function as a control unit that controls the movement of the image sensor 101. The camera microcomputer 102 calculates a shift amount (driving amount) of the image sensor 101 for reducing (correcting) image blur due to the camera shake using the camera shake detection signal, and issues an image stabilization instruction including the shift amount to a sensor image stabilization control unit 103. The sensor image stabilization control unit 103 controls an actuator included in the shifting mechanism in accordance with the image stabilization instruction from the camera microcomputer 102 to shift the image sensor 101 by the shift amount. As a result, sensor image stabilization (image blur correction) is performed.

The camera microcomputer 102 instructs a posture detection unit 104 to detect the posture of the camera body 100 (hereinafter referred to as "camera posture"), and the posture detection unit 104 detects the camera posture and sends a posture detection signal to the camera microcomputer 102. The camera posture includes an upright state, vertical states (grip on the top, and grip on the bottom), and a facing-up state. Further, the camera microcomputer 102 can communicate with a lens microcomputer 226 via a camera communication unit 106 and a lens communication unit 229 in the interchangeable lens 200.

In the interchangeable lens 200, the imaging optical system 210 has a zoom lens 201, a diaphragm 202, a focus lens 203, and an image stabilization lens (optical element) 204. A zoom control unit 221 can detect the position of the zoom lens 201 (referred to as "zoom position", hereinafter), and drives the zoom lens 201 according to a zoom drive command from the camera microcomputer 102 to change the magnification. A focus control unit 223 can detect the position of the focus lens 203 (referred to as "focus position", hereinafter), and performs focus adjustment by driving the focus lens 203 according to a focus drive command from the camera microcomputer 102.

A diaphragm control unit 222 can detect an aperture diameter of the diaphragm 202 (referred to as "aperture position", hereinafter), and drives the diaphragm 202 according to a diaphragm drive command from the camera microcomputer 102 to adjust the light amount. The diaphragm control unit 222 may detect and control the aperture position continuously, or may detect and control the aperture position discontinuously such as the full-open position, positions changed by two stops (medium), and positions changed by one stop (minimum). Further, in detecting the aperture position, the aperture position may be detected using a driving amount of a driving mechanism that drives the diaphragm 202.

Then, the zoom position, the aperture position and the focus position detected by the zoom control unit 221, the diaphragm control unit 222 and the focus control unit 223, respectively, are transmitted to the camera microcomputer 102. The zoom position to be transmitted may be information on the position of the zoom lens 201 or information on the focal length corresponding to the zoom position.

When stabilizing the image, the image stabilization lens 204 can be shifted by a shifting mechanism (not shown) in a direction including a direction component which is orthogonal to the optical axis. That is, the image stabilization lens 204 may shift in a plane orthogonal to the optical axis, or may rotate about a point on the optical axis.

A lens shake detection unit 228 detects the shake of the interchangeable lens 200 (referred to as "lens shake", hereinafter) caused by the users hand shake and so on, and outputs a lens shake detection signal indicating the lens shake to the lens microcomputer 226.

The lens microcomputer 226 calculates a shift amount of the image stabilization lens 204 for reducing (correcting) the image blur caused by the lens shake by using the lens shake detection signal, and output an image stabilization instruction including the shift amount to a lens image stabilization control unit 224. The lens image stabilization control unit 224 controls the movement of the image stabilization lens 204 based on the image stabilization instruction from the lens microcomputer 226. Specifically, lens image stabilization is performed by driving the image stabilization lens 204 by the calculated shift amount by controlling an actuator included in the shifting mechanism according to the image stabilization instruction. The lens microcomputer 226 has a function as a transmission unit that reads information such as image circle information and the like described later stored in a data storage 227 and transmits the image circle information and the like to the camera body 100.

The data storage 227 stores optical information such as a zoom range (changeable range of focal length), a focus range (focusable distance range), a changeable range of an aperture value, and so on of the imaging optical system 210.

The data storage 227 also stores information about the image circle of the imaging optical system 210 (referred to as "image circle information", hereinafter). Here, the image circle information includes information indicating the position of the image circle and information indicating the size of the image circle. In this embodiment, image circle center information indicating the center position of the image circle is stored as information indicating the position of the image circle.

Figure 2:
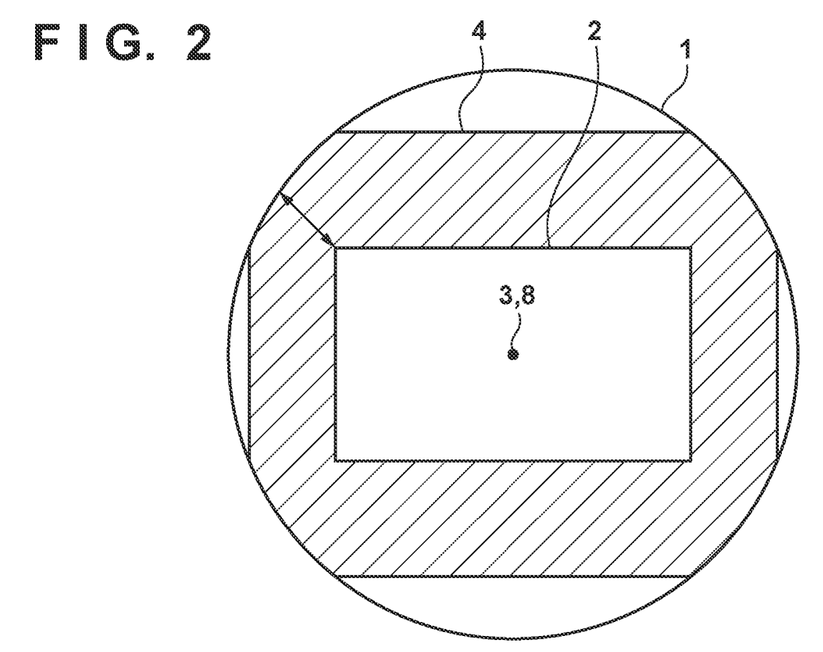
FIG. 2 is a diagram illustrating a shiftable range of an image sensor when the center of the image circle of an interchangeable lens is not displaced from the center of the image sensor.

FIG. 2 shows a shiftable range 4 of a light receiving area 2 in an ideal state where the center 3 of an image circle 1 of the imaging optical system 210 coincides with the center 8 of the light receiving area 2 of the image sensor 101. A shiftable range is usually symmetrical both in the vertical and horizontal directions with respect to the center position of the image stabilization control (hereinafter referred to as the "image stabilization center"). The image stabilization center refers to the position where the center 8 of the light receiving area of the image sensor 101 is located when the shake amount detected by the camera shake detection unit 105 is zero. Here, if the image sensor 101 is shifted so that the light receiving area 2 does not exceed an image circle 1, the shiftable range 4 reaches its maximum when the center 8 of the light receiving area 2 that coincides with the center 3 of the image circle 1 is the image stabilization center.

Figure 3:
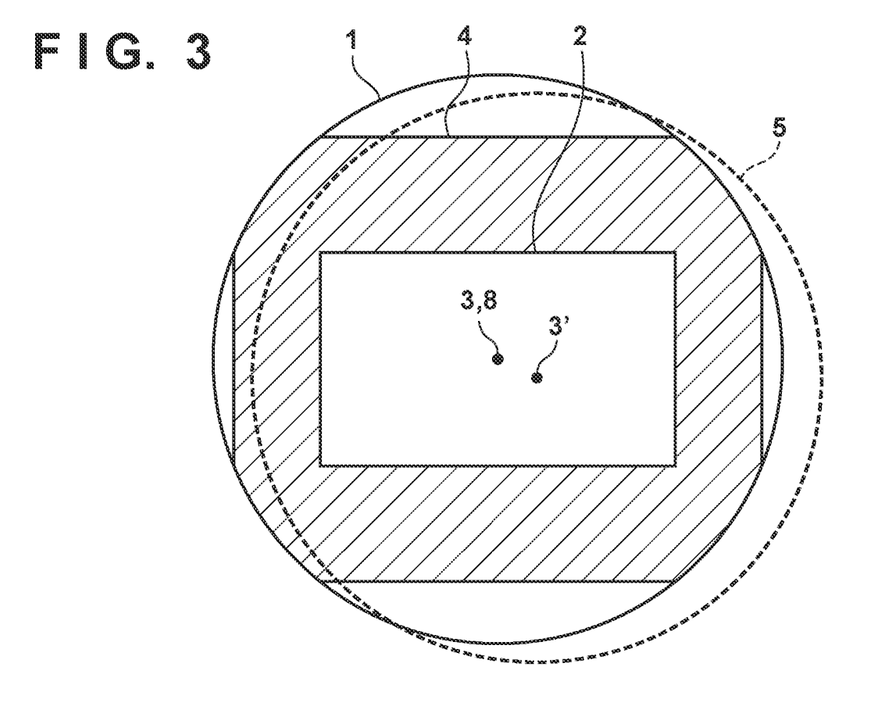
FIG. 3 is a diagram illustrating a shiftable range of the image sensor when the center of the image circle of an interchangeable lens is displaced from the center of the image sensor.

FIG. 3 shows an image circle 5 (center 3') in which the ideal image circle 1 shown in FIG. 2 is shifted to the lower right with respect to the light receiving area 2 (center 8) of the image sensor 101 due to manufacturing errors of the interchangeable lens. In this state, if the image sensor 101 is shifted so that the light receiving area 2 does not exceed the image circle 5, the shiftable amount in the upper left direction or the lower left direction becomes smaller than that in the state shown in FIG. 2. Moreover, in the state shown in FIG. 3, if the image sensor 101 is shifted in the upper left direction or the lower left direction to the maximum amount of the shiftable range 4 shown in FIG. 2, the upper left portion or the lower left portion of the light receiving area 2 goes beyond the image circle 5. In this case, the upper left corner and the lower left corner of an image formed by an image signal become dark, and the quality of the image deteriorates.

Figure 4:
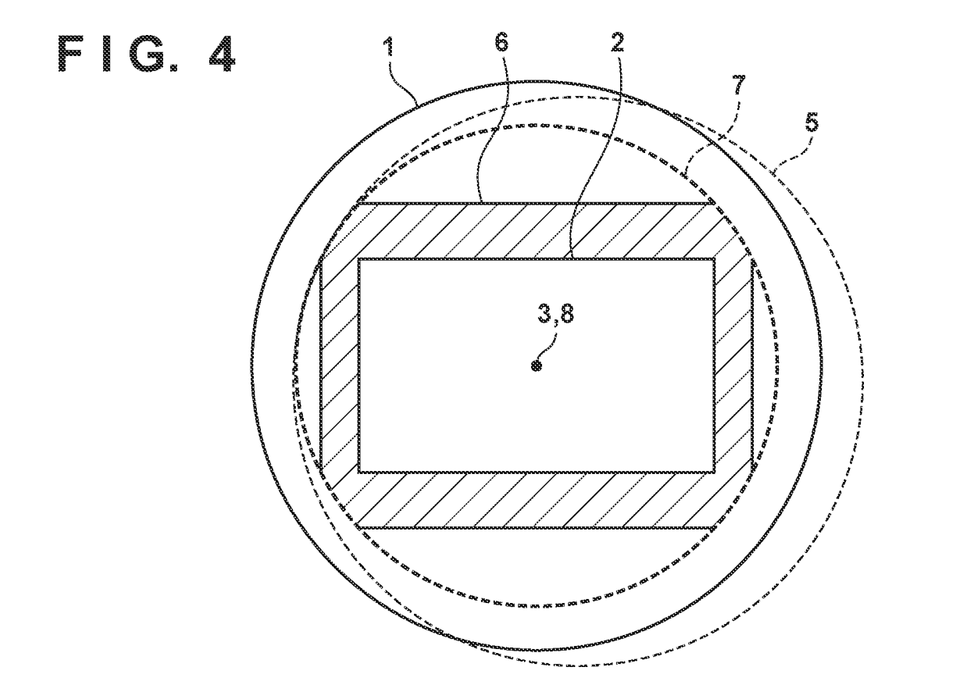
FIG. 4 is a diagram for explaining a shiftable range of the image sensor that is allowed when an effective image circle is defined in the case of FIG. 3.

Since the manufacturing errors of the interchangeable lens are caused by the decentering of optical elements forming the imaging optical system 210 from the optical axis, the errors can occur in any direction depending on the decentering direction of each interchangeable lens. Therefore, given that the shift amount of the image circle 5 is the maximum manufacturing error, in order to prevent the light receiving area 2 from going beyond the image circle regardless of any interchangeable lens being attached, it is conceivable to define an effective image circle 7 as shown in FIG. 4. The effective image circle 7 is a circle whose center coincides with the center 8 of the light receiving area 2 and whose radius is the shortest distance from the center 8 of the light receiving area 2 to the rim of the image circle 5. By setting a shiftable range 6 within the effective image circle 7, it is possible to prevent the light receiving area 2 from going beyond the image circle during the image stabilization control regardless of any interchangeable lens being attached. However, in the shiftable range 6, the shiftable amount decreases in any direction as compared with the shiftable range 4, and it is not possible to perform sufficient sensor image stabilization.

Also, if the image circle 1 is designed to be large in order to enlarge the effective image circle 7, the entire interchangeable lenses become large.

With respect to the above-mentioned problem, in the present embodiment, the image circle information is stored in advance in the data storage 227 of the interchangeable lens 200 as described above. This image circle information is obtained through measurement at the time of manufacturing each interchangeable lens, for example. More specifically, for example, the shift amount and the shift direction of the actual image circle 5 (center 3') with respect to the ideal image circle 1 (center 3) shown in FIG. 3 are measured for each interchangeable lens. Then, the shift amount obtained by the measurement and vector information indicating the shift direction are stored in the data storage 227 as the image circle center information indicating the center position of the image circle 5. The lens microcomputer 226 sends the image circle information to the camera microcomputer 102 when the interchangeable lens 200 is connected to the camera body 100, and the camera microcomputer 102 stores the received image circle information in the data storage unit (not shown) in the camera body 100. The image stabilization center and the shiftable range are set as will be described later by using this information.

Figure 5:
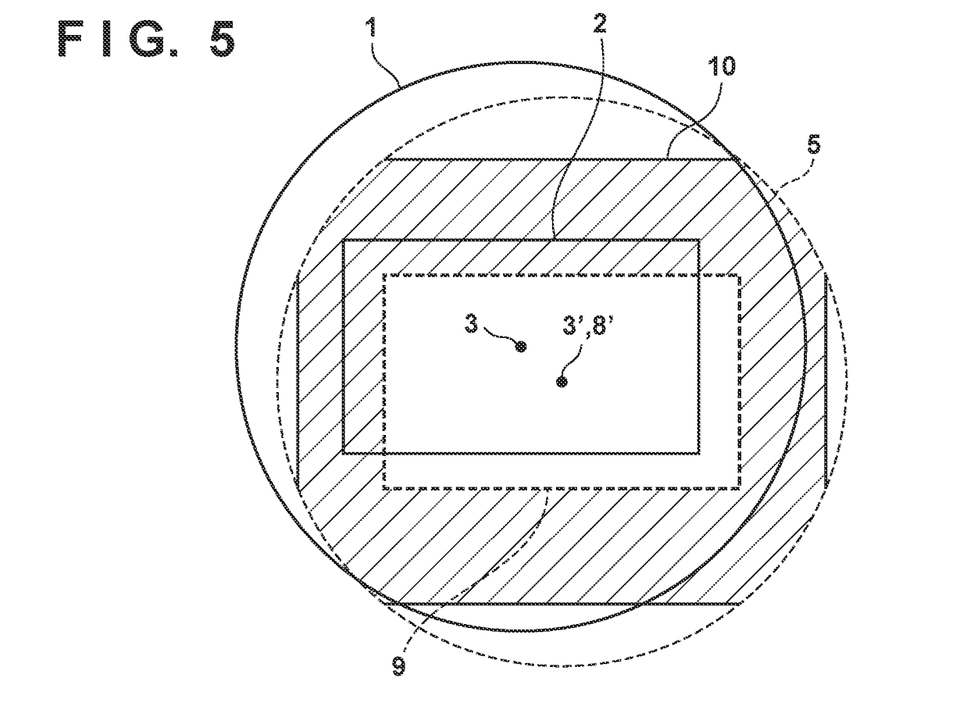
FIG. 5 is a diagram illustrating a shiftable range of the image sensor when the center of the image sensor is shifted toward the center of the image circle of the interchangeable lens in the case of FIG. 3.

First, the camera microcomputer 102 uses the received image circle center information to set an initial position (initial sensor shift position) 9 (center 8') of shifting of the light receiving area 2 in the image stabilization control, as shown in FIG. 5. At this time, since the center 8' of the initial sensor shift area 9 becomes the image stabilization center, the initial sensor shift area 9 is set so that the image stabilization center 8' coincides with the center 3' of the image circle 5. Then, the light receiving area 2 is shifted to the initial sensor shift area 9. In this way, by making the center 8' of the image stabilization control coincident with the center 3', it is possible to secure the shiftable range 10 that is approximately the same as that in the ideal state shown in FIG. 2.

Here, the center 3' and the size of the image circle 5 change depending on the zoom position, the focus position, the aperture state, and the camera posture (upright position, grip-on-the-top position, grip-on-the-bottom position, facing-up position) as optical states of the imaging optical system 210. Therefore, in order to secure the maximum effective shiftable range even in a case where the zoom position, focus position, aperture state, and camera posture change, the center 3' of the image circle 5 and the image stabilization center 8' after the change need to be matched, and it is necessary to move the light receiving area 2 to the initial sensor shift area 9. Therefore, the camera microcomputer 102 periodically acquires information on the optical state of the imaging optical system 210, and based on the image circle center information and the optical information which were received from the imaging optical system 210, acquires the center position of the image circle corresponding to the current optical state. Note that the information on the optical state may be acquired at the timing when the change in the optical state occurs, instead of being acquired periodically.

However, for example, during shooting a time-lapse moving image or when shooting an image with a camera attached to a tripod, it is conceivable that the user expects that a composition barely changes. In such cases, depending on the shooting state, the composition changes against the user's intention as the light receiving area 2 moves depending on the optical state of the imaging optical system 210 and the camera posture, and an obtained image may differ from what the user is intended.

Accordingly, in the present embodiment, the camera body 100 determines whether or not a current state is to give priority to a state in which a composition does not change (hereinafter, referred to as "priority state"). If the priority state is determined, the center position of the image stabilization control at the time of transition to the priority state is fixed as the image stabilization center. The center position of the image stabilization control at the time of transition to the priority state coincides with the center position of the light receiving area 2 of the image sensor 101 when the shake amount of the camera is 0 at the time of transition to the priority state.

Figure 6:
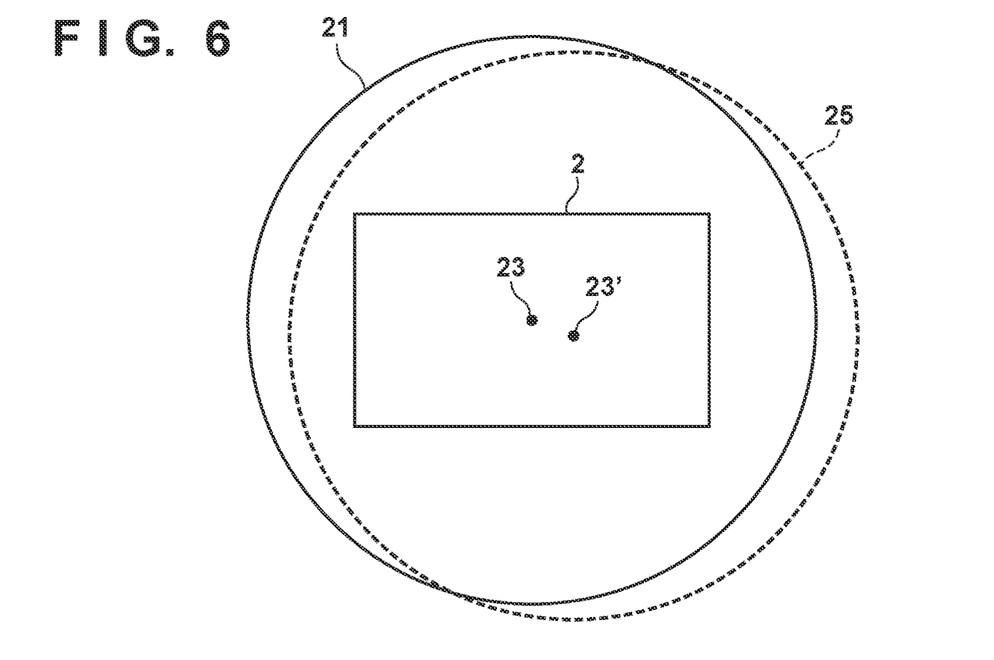
FIG. 6 is a diagram showing a center position of image stabilization control for the image sensor in a priority state according to the first embodiment.

Here, the image stabilization center in the priority state will be described with reference to FIG. 6. At the time of transition to the priority state, the image stabilization center is set at the center 23 of an image circle 21. Then, it is assumed that with the priority state being maintained, the zoom position, the focus position, the aperture state, and the camera posture as the optical states of the imaging optical system 210 change, the image circle 21 changes to an image circle 25, and the position of the center 23 also moves to the position of a center 23'. In this case, the center 23 of the image circle 21 before the change is fixed as an image stabilization center.

In the present embodiment, the priority state is determined when it is detected that the camera body 100 is shooting a time-lapse moving image or the camera body 100 is attached to a tripod. As for the detection of a state in which the camera body 100 is attached to a tripod, the angular velocity is detected with a gyro built in the camera body 100 and the vibration state of the camera body 100 is estimated from the detected angular velocity information, and if the detected angular velocity is a certain threshold or below, it is detected that the camera body 100 is attached to a tripod. When the priority state is determined as described above, the image stabilization center is fixed at the position at the time of detecting the priority state. Then, when the priority state is released, it is controlled so that the image stabilization center is moved to the center position of an image circle as the image circle changes.

Figure 7:
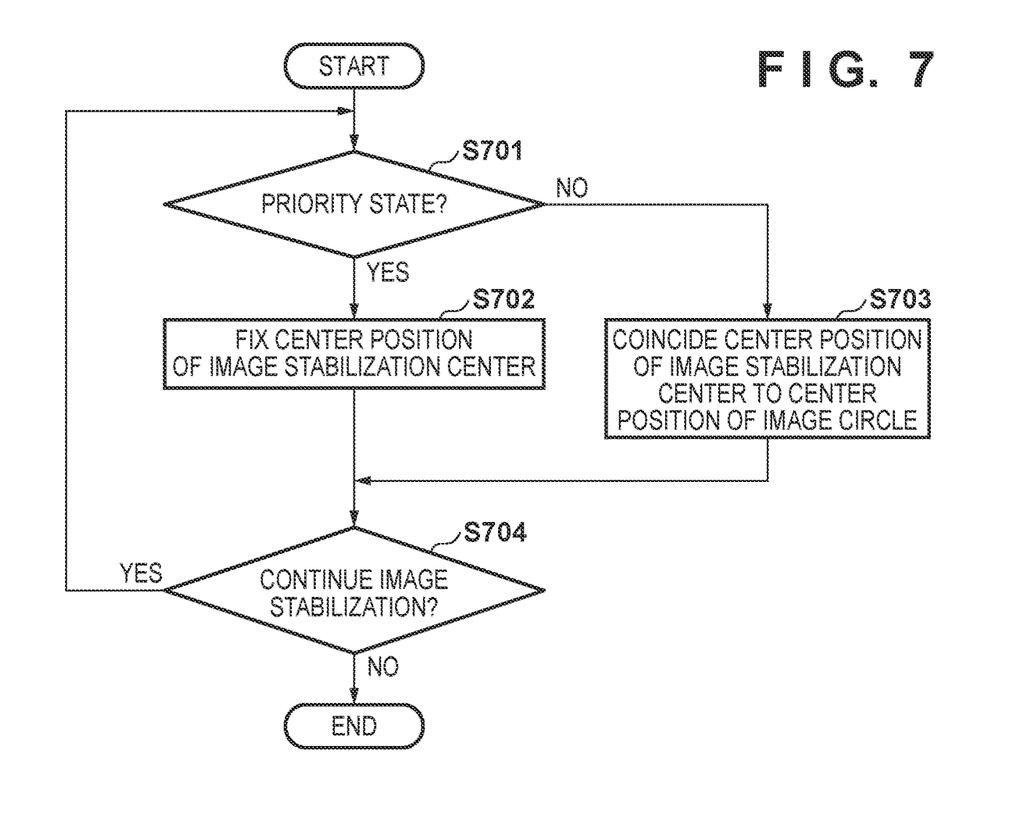
FIG. 7 is a flowchart showing image stabilization control processing according to the priority state according to the first embodiment.

Next, the processing performed by the camera microcomputer 102 in this embodiment will be described using the flowchart shown in FIG. 7. When the camera body 100 is turned on and the image stabilization control is started, the camera microcomputer 102 determines in step S701 whether the camera body 100 is in the priority state. In this embodiment, as an example, the camera microcomputer 102 determines that the camera body 100 is in the priority state in a case where it is detected that a time-lapse moving image shooting is started or the camera body 100 is attached to a tripod. If the priority state is determined, the process proceeds to step S702, and if the priority state is not determined, the process proceeds to step S703.

In step S702, the image stabilization center of the image sensor 101 is fixed to the position of the image stabilization center when the priority state is determined. On the other hand, in step S703, the image stabilization center of the image sensor 101 is made to coincide with the center of the image circle. Then, the process proceeds to step S704, and if the image stabilization is to be continued, the process returns to step S701 to continue the above processes. If the image stabilization is to be ended, the processing is ended.

According to the first embodiment as described above, when the image circle moves, it is possible to prevent the image sensor from moving and a composition from largely changing against the user's intention for shooting.

In addition, in first embodiment, it is explained that the center 8' of the initial sensor shift area 9 is made to coincide with the center 3' when the camera body 100 is not in a priority state, however, the present invention is not limited to this. By bringing the center 8' of the initial sensor shift area 9 closer to the center 3', the shiftable range can be made larger than the shiftable range 6 shown in FIG. 4.

Second Embodiment

Next, a second embodiment of the present invention will be described. In the second embodiment, a case will be described in which the priority state described in the first embodiment is replaced by a plurality of priority states, and the image stabilization center of the image sensor differs between the priority states. Since the configuration of the image capturing system is the same as that of the first embodiment, the description thereof will be omitted and only the difference in operation will be described.

In the second embodiment, a plurality of priority states are used. As an example, the first to third priority states are used. Similar to the first embodiment, when it is detected that the camera body 100 is shooting a time-lapse moving image or the camera body 100 is attached to a tripod, the first priority state is determined. When it is detected that the camera body 100 is stationarily handheld and is in the moving image shooting mode (hereinafter, referred to as "powered IS state"), the second priority state is determined. The third priority state is determined while the camera body 100 is recording a moving image in the moving image shooting mode. In the above three shooting states, it is considered that the user does not want to change the composition so much, thus the priority state is determined.

Figure 8A:
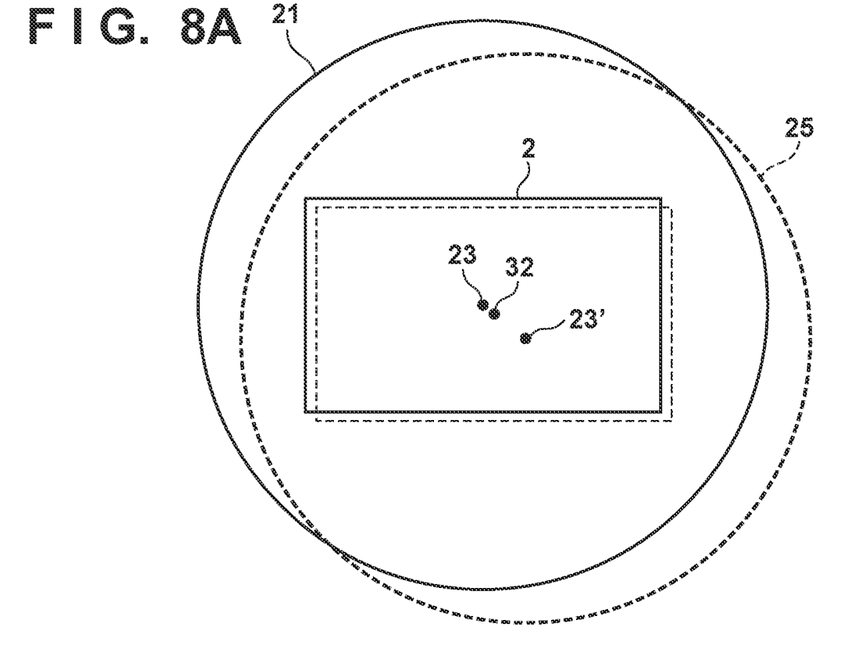
FIGS. 8A and 8B are diagrams showing the center position in image stabilization control for an image sensor in each priority state according to a second embodiment.
Figure 8B:
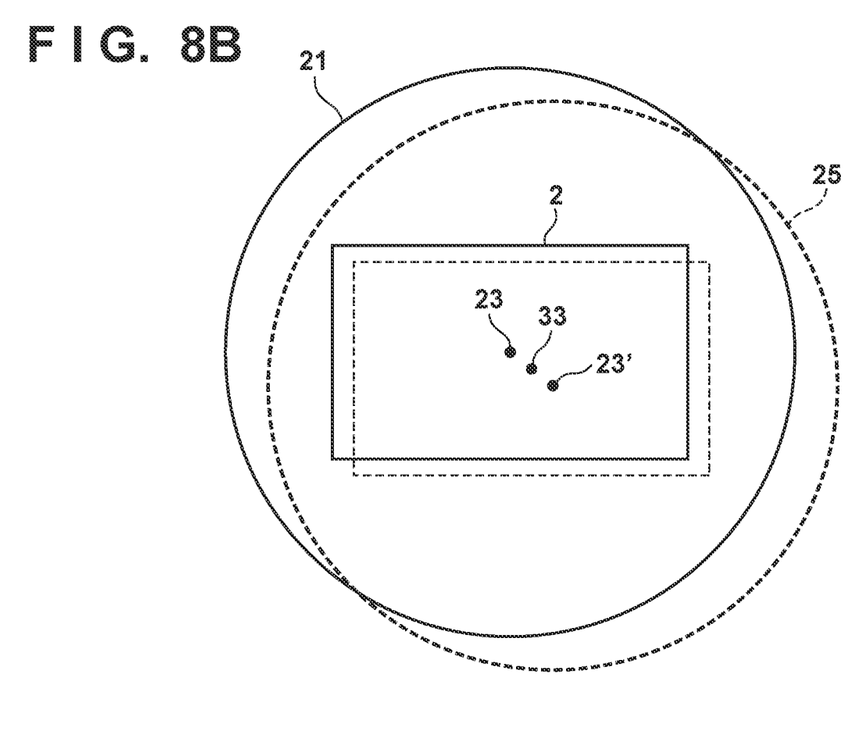

Referring to FIGS. 8A and 8B, it is considered that an image circle 21 (center 23) at the time of transition to the priority state is moved to a position of an image circle 25 (center 23') due to the change in the optical state of the imaging optical system 210 such as the zoom position, the focus position and the aperture state, and in the camera posture while the priority state is maintained. At this time, in the second embodiment, the image stabilization center of the image sensor 101 is set at a position between the center 23 and the center 23' of the image circles according to the priority state. Here, $IL_1$ denotes a shift amount of the image sensor 101 from the image stabilization center of the image sensor 101 at the time of transition to the priority state to the center 23' of the image circle 25. Also, $IL_2$ denotes a shift amount to the image stabilization center of the image sensor 101 at the time of transition to the priority state to the image stabilization center of the image sensor 101 in each priority state. $\beta_{1\sim3}$ denotes gain setting values in respective priority states ($\beta_1$ in the first priority state, $\beta_2$ in the second priority state, and $\beta_3$ in the third priority state). In this case, $IL_2$ can be calculated from the equation (1) below.

$$IL_2 = IL_1 \times \beta_{1\sim3} \qquad (1)$$

Figure 9:
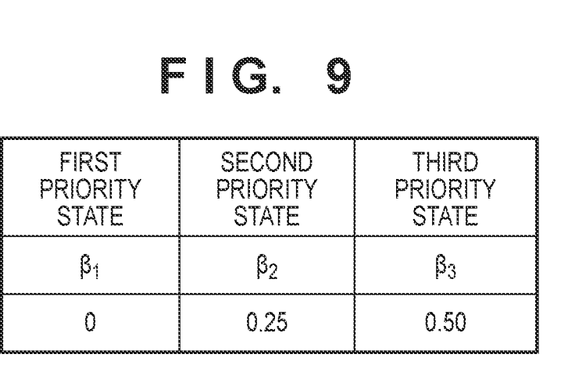
FIG. 9 is a diagram showing gain values set in each priority state according to the second embodiment.

FIG. 9 shows an example of the gain setting values $\beta_{1\sim3}$ in the respective priority states in the second embodiment. The closer to 0 the gain setting value $\beta$ is, the closer to the center of the image stabilization control of the image sensor 101 at the time of transition to the priority state the image stabilization center of the image sensor 101 is in the priority state. The image stabilization center of the image sensor 101 in each priority state will be described with reference to FIGS. 8A and 8B. In the case of the first priority state, similarly to the first embodiment as shown in FIG. 6, the center 23 is set as the image stabilization center of the image sensor 101. In the case of the second priority state, the position 32 shown in FIG. 8A is set as the image stabilization center of the image sensor 101, and in the case of the third priority state, the position 33 shown in FIG. 8B is set as the image stabilization center of the image sensor 101.

Figure 10:
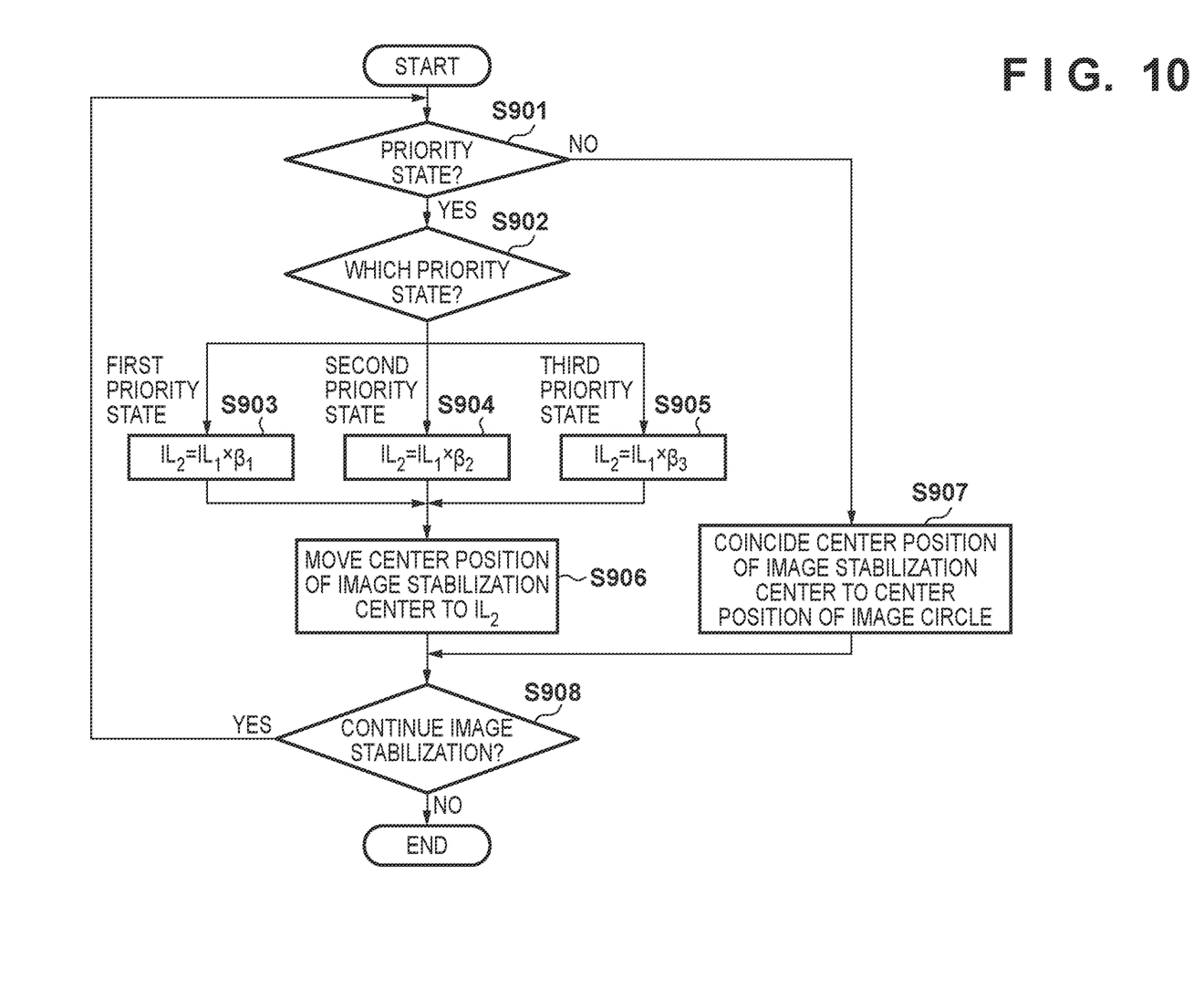
FIG. 10 is a flowchart showing image stabilization control processing according to the priority state according to the second embodiment.

FIG. 10 is a flowchart for calculating the image stabilization center of the image sensor 101 in the second embodiment. When the power of the camera body 100 is turned on and the image stabilization control is started, the camera microcomputer 102 determines in step S901 whether or not the camera body 100 is in the priority state. If the priority state is determined, it is determined in step S902 which priority state the camera body 100 is in. In the case where the camera body 100 detects that a time-lapse moving image is being shot or the camera body is attached to the tripod, the first priority state is determined, and the image stabilization center in the first priority state is calculated in step S903. If it is determined in step S902 that the camera body 10 is in the powered IS state, the second priority state is determined, and the image stabilization center in the second priority state is calculated in step S904. If it is determined in step S902 that the camera body 100 is recording a moving image, the third priority state is determined, and the image stabilization center in the third priority state is calculated in step S905.

Next, in step S906, the image stabilization center of the image sensor 101 is set to the position calculated in any of steps S903 to S905 described above, and the process proceeds to step S908.

On the other hand, in a case where the priority state is not determined by the camera microcomputer 102, in step S907, the image stabilization center of the image sensor 101 is moved to the center position of the current image circle as in the first embodiment, and the process proceeds to step S908.

In step S908, it is determined whether or not to continue the image stabilization. If the image stabilization is to be continued, the process returns to step S901 and the above processes are repeated, and if the image stabilization is to be ended, it is ended.

As described above, according to the second embodiment, in addition to the same effect as that of the first embodiment, it is possible to achieve a balance between a composition according to the shooting state and the image stabilization control. It should be noted that, in the second embodiment, a mode is provided in which the center position of the image stabilization control is fixed at the center position of the light receiving area 2 at the time of transition to the priority state ($\beta=0$ in the first priority state), however, it is not always necessary to provide this priority state. $\beta$ can be appropriately set according to the shooting states and modes of the image capturing apparatus. Further, moving the image stabilization center of the image sensor 101 to the center position of the changed image circle when the priority state is not set as in the second embodiment can be regarded as $\beta=1$. If $\beta$ in the priority state is smaller than that in the non-priority state, it is possible to reduce the change in the composition in the priority state caused by the change in the center position of the image circle.

In the case of $0<\beta<1$, the center position of the image stabilization control need not be on the straight line connecting the center position of the light receiving area at the time of transition to the priority state and the center position of the changed image circle. If the center position of the image stabilization control is controlled so as to move toward the center position of the changed image circle from the center position of the light receiving area at the time of transition to the priority state, the effect of the present embodiment can be obtained.

Third Embodiment

Next, a third embodiment of the present invention will be described. In the third embodiment, in a case where there are a plurality of priority states as described in the second embodiment and the image stabilization center of the image sensor differs between the priority states, a case of adding the fourth and fifth priority states which area different from the first to third priority states described above will be described. The configuration of the image capturing system is the same as that of the first embodiment, and the operations for the first to third priority states are the same as those of the second embodiment, so the description thereof will be omitted and the operation in the added priority states will be solely explained.

In the third embodiment, as an example, the fourth priority state is determined in a case where it is detected that the camera body 100 is being exposed in the still image shooting mode. Further, if it is detected that the camera body 100 is performing continuous shooting or bracket shooting, the fifth priority state is determined. In the above three shooting states, it is considered that the user does not want to change the composition so much, so the priority state is determined.

The overall process in the third embodiment is the same as that described in the second embodiment, but the equation for calculating the shift amount $IL_2$ to the image stabilization center of the image sensor 101 in each priority state is different. When the gain setting values in the respective priority states are defined by $\beta_{4-5}$ ($\beta_4$ in the fourth priority state, $\beta_5$ in the fifth priority state), $IL_2$ can be calculated from the equation (2) below.

$$IL_2 = IL_1 \times \beta_{4-5} \quad (2)$$

Figure 11:
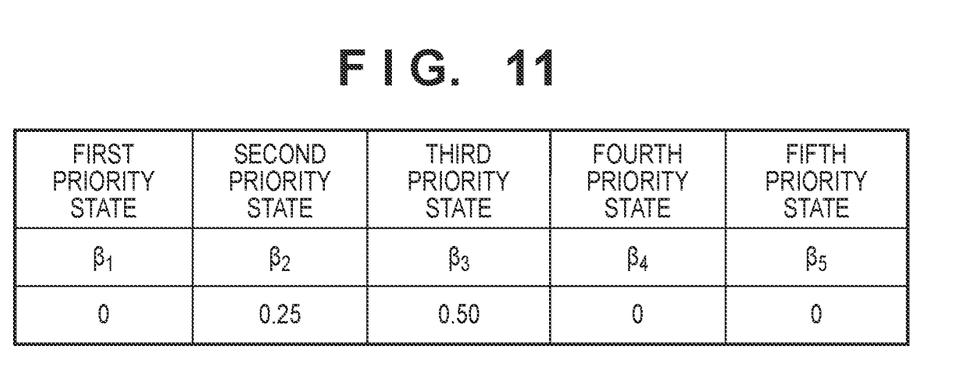
FIG. 11 is a diagram showing gain values set in each priority state according to a third embodiment.

FIG. 11 shows an example of the gain setting values $\beta_{1-5}$ in the respective priority states in the second embodiment. The gain setting values $\beta_{1-3}$ are the same as those explained in the second embodiment. The closer to 0 the gain setting value $\beta$ is, the closer to the center of the image stabilization control of the image sensor 101 at the time of transition to the priority state the image stabilization center of the image sensor 101 is in the priority state.

Figure 12:
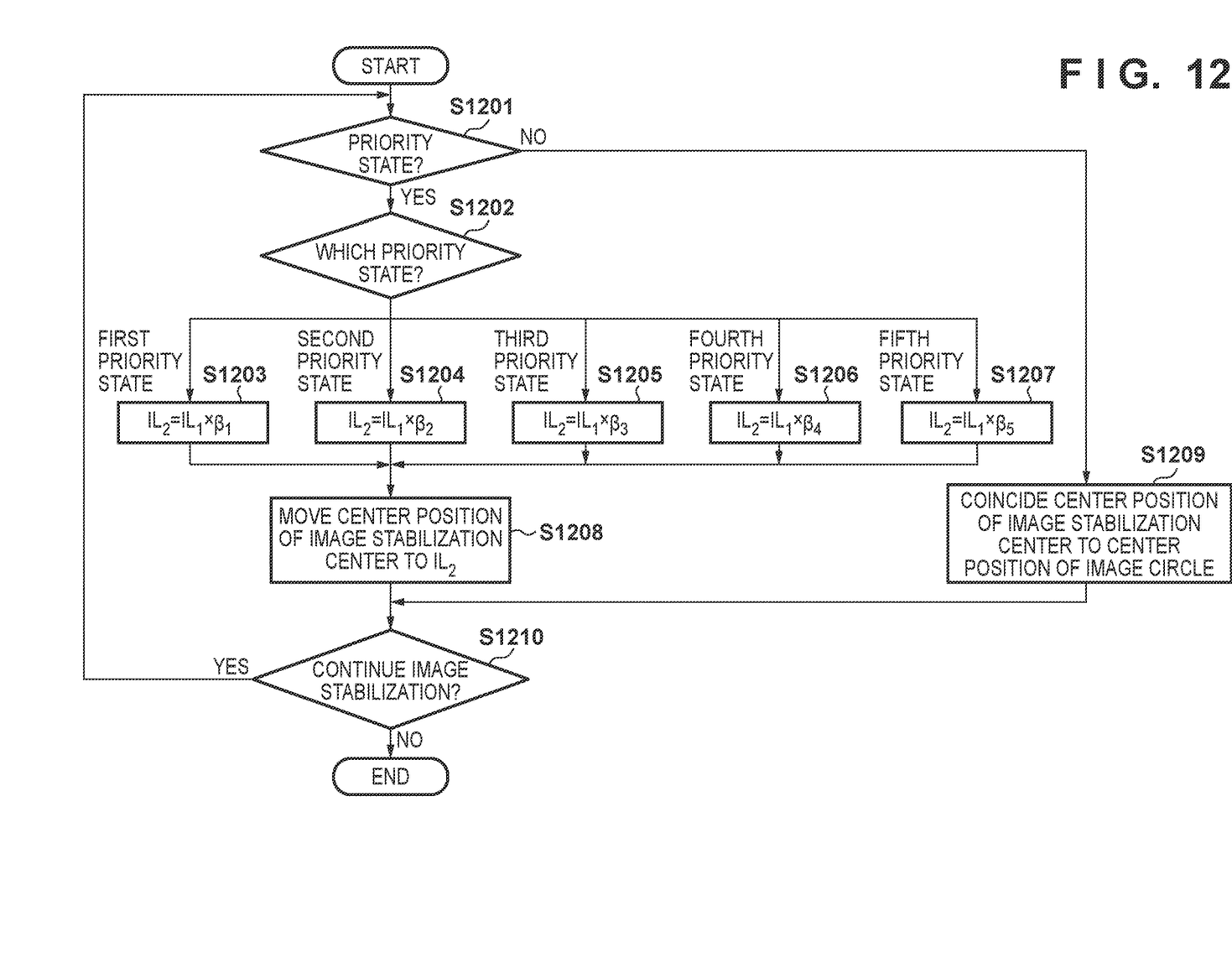
FIG. 12 is a flowchart showing image stabilization control processing according to the priority state according to the third embodiment.

FIG. 12 is a flowchart for calculating the image stabilization center of the image sensor 101 in the third embodiment. FIG. 12 is a flowchart in which explanation of the fourth and fifth priority states of the third embodiment is added to the flowchart for calculating the image stabilization center of the image sensor 101 described with reference to FIG. 10 in the second embodiment.

When the power of the camera body 100 is turned on and the image stabilization control is started, the camera microcomputer 102 determines in step S1201 whether or not the camera body 100 is in the priority state. If the priority state is determined, it is determined in step S1202 which priority state the camera body 100 is in. In the case where it is detected that the camera body 100 is under exposure, the fourth priority state is determined, and the image stabilization center in the fourth priority state is calculated in step S1206. If it is determined in step S1202 that the camera body 100 is performing continuous shooting or bracket shooting, the fifth priority state is determined, and the image stabilization center in the fifth priority state is calculated in step S1207. Since the processes from steps S1202 to steps S1203 to S1205 are the same as the processes from step S902 to steps S903 to S905 in FIG. 10, description thereof will be omitted here.

Next, in step S1208, the image stabilization center of the image sensor 101 is set to the position calculated in any of steps S1203 to S1207 described above, and the process proceeds to step S1210.

On the other hand, in a case where the priority state is not determined by the camera microcomputer 102, in step S1209, the image stabilization center of the image sensor 101 is moved to the center position of the current image circle as in the first embodiment, and the process proceeds to step S1210.

In step S1210, it is determined whether or not to continue the image stabilization. If the image stabilization is to be continued, the process returns to step S1201 and the above processes are repeated, and if the image stabilization is to be ended, it is ended. In the third embodiment, in the fourth priority state, the process returns to step S1201 and the above processes are continued during the exposure period, and the process is ended as soon as the exposure period ends. As for the fifth priority state, the process returns to step S1201 and the above processes are continued during the continuous shooting or bracket shooting is being performed, and the process is ended as soon as the continuous shooting or bracket shooting ends.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197650, filed on Oct. 30, 2019, and No. 2020-046838, filed on Mar. 17, 2020 which are hereby incorporated by reference herein in their entirety.

What is claimed is:

1. An image stabilization apparatus comprising:
a calculation unit that calculates a driving amount for moving an image sensor so as to compensate for shake;

an image stabilization control unit that controls image stabilization by moving the image sensor based on the driving amount calculated by the calculation unit;

a determination unit that determines whether a current state of the image stabilization apparatus is a first state or a second state according to an image shooting state; and a control unit that controls a center position of image stabilization control based on an acquired center position of an image circle of a lens apparatus attached to an image capturing apparatus having the image sensor, wherein the control unit is configured to, responsive to the acquired center position of the image circle of the lens apparatus shifting from a first lens position to a second lens position, set an initial center shift position and a shiftable range of the image stabilization control at:

(i) a first sensor position which is a first distance from the second lens position when the image stabilization apparatus is in the first state, and (ii) a second sensor position which is a second distance from the second lens position when the image stabilization apparatus is in the second state, wherein the first distance is larger than the second distance, wherein each unit is implemented by one or more processors, circuitry or a combination thereof.

2. The image stabilization apparatus according to claim 1, wherein the control unit controls to shift the initial center shift position of the image stabilization control toward the second lens position in the case where the acquired center position of the image circle shifts from the first lens position to the second lens position and the current state is determined to be the second state.

3. The image stabilization apparatus according to claim 2, wherein the control unit controls to shift the initial center shift position of the image stabilization control to the second lens position in the case where the acquired center position of the image circle shifts from the first lens position to the second lens position and the current state is determined to be the second state.

4. The image stabilization apparatus according to claim 1, wherein the control unit controls not to shift the initial center shift position of the image stabilization control to the second lens position in the case where the first state is determined regardless of the acquired center position of the image circle shifting from the first lens position to the second lens position.

5. The image stabilization apparatus according to claim 4, wherein the control unit sets the initial center shift position of the image stabilization control at a center position of the image stabilization control at a timing of transition to the first state.

6. The image stabilization apparatus according to claim 1, further comprising an acquisition unit that acquires information on the acquired center position of the image circle of the lens apparatus based on an optical state of the lens apparatus, wherein the acquisition unit is implemented by one or more processors, circuitry or a combination thereof.

7. The image stabilization apparatus according to claim 6, wherein the optical state includes at least one of a zoom position, focus position and aperture state.

8. The image stabilization apparatus according to claim 1, wherein the determination unit determines the first state or the second state based on a state of the shake and whether an image shooting mode is a moving image shooting mode or a still image shooting mode.

9. The image stabilization apparatus according to claim 1, wherein the image shooting state corresponding to the first state includes at least one of shooting a time-lapse moving image and shooting an image with the image capturing apparatus being attached to a tripod.

10. The image stabilization apparatus according to claim 1, wherein the image shooting state corresponding to the first state includes a state during exposure in a still image shooting mode.

11. The image stabilization apparatus according to claim 10, wherein the image shooting state corresponding to the first state includes at least one of during exposure, during continuous shooting, and during bracket shooting.

12. The image stabilization apparatus according to claim 1, wherein the determination unit further determines whether or not the current state is a third state corresponding to a predetermined shooting state which is different from the shooting state corresponding to the first state, wherein in a case where the acquired center position of the image circle is moved from the first lens position to the second lens position, the control unit controls the initial center shift position of the image stabilization control to shift by, in a case where the current state is determined to be the third state, a shift amount which is larger than in a case where the current state is determined to be the first state, and smaller than in a case where the current state is determined to be the second state.

13. The image stabilization apparatus according to claim 12, wherein, in a case where the acquired center position of the image circle is moved from the first lens position to the second lens position, the control unit controls to shift the center position of the image circle to a position between the center position of the image stabilization control at a time of transition to the third state and the center position of the moved image circle according to the third state.

14. The image stabilization apparatus according to claim 12, wherein the determination unit determines whether or not the current state is the third state based on a state of the shake and an image shooting mode.

15. The image stabilization apparatus according to claim 14, wherein the image shooting state corresponding to the third state includes at least one of a state in which the image capturing apparatus is stationary in a moving image shooting mode and a state in which a moving image is being recorded in the moving image shooting mode.

16. The image stabilization apparatus according to claim 12, wherein the control unit controls the shift amount of the center position of the image stabilization control so as to be smaller in a case where at least one of the zoom position, focus position and aperture state of the lens apparatus and a posture of the image capturing apparatus is changed from a fourth state to a fifth state and the current state is determined to be the first state by the determination unit than the shift amount in a case where the fourth state is changed to the fifth state and the current state is determined to be the second state by the determination unit in the third state.

17. An image capturing apparatus to which a lens apparatus is attached, comprising:

an image sensor that performs photoelectric conversion on a subject image formed by the lens apparatus and outputs an image signal;

a driving unit that drives the image sensor according to a driving amount for compensating shake; and an image stabilization apparatus comprising:

a calculation unit that calculates the driving amount;

an image stabilization control unit that controls image stabilization by controlling the driving unit based on the driving amount calculated by the calculation unit;

a determination unit that determines whether a current state of the image stabilization apparatus is a first state or a second state according to an image shooting state; and a control unit that controls a center position of image stabilization control based on an acquired center position of an image circle of the lens apparatus, wherein the control unit is configured to, responsive to the acquired center position of the image circle of the lens apparatus shifting from a first lens position to a second lens position, set an initial center shift position and a shiftable range of the image stabilization control at:

(i) a first sensor position which is a first distance from the second lens position when the image stabilization apparatus is in the first state, and (ii) a second sensor position which is a second distance from the second lens position when the image stabilization apparatus is in the second state, wherein the first distance is larger than the second distance, wherein each unit is implemented by one or more processors, circuitry or a combination thereof.

18. An image stabilization method comprising:

calculating a driving amount for moving an image sensor so as to compensate for shake;

controlling image stabilization by moving the image sensor based on the driving amount calculated by the calculation unit;

determining whether a current state is a first state or a second state according to an image shooting state; and controlling a center position of image stabilization control based on an acquired center position of an image circle of a lens apparatus attached to an image capturing apparatus having the image sensor, wherein control of the center position of the image stabilization control includes, responsive to the acquired center position of the image circle of the lens apparatus shifting from a first lens position to a second lens position, setting an initial center shift position and a shiftable range of the image stabilization control at:

(i) a first sensor position which is a first distance from the second lens position when the image stabilization apparatus is in the first state, and (ii) a second sensor position which is a second distance from the second lens position when the image capturing apparatus is in the second state, wherein the first distance is larger than the second distance.

19. A non-transitory computer-readable storage medium, the storage medium storing a program that is executable by the computer, wherein the program includes program code for causing the computer to function as an image stabilization apparatus comprising:

a calculation unit that calculates a driving amount for moving an image sensor so as to compensate for shake;

an image stabilization control unit that controls image stabilization by moving the image sensor based on the driving amount calculated by the calculation unit;

a determination unit that determines whether a current state of the image stabilization apparatus is a first state or a second state according to an image shooting state; and a control unit that controls a center position of image stabilization control based on an acquired center position of an image circle of a lens apparatus attached to an image capturing apparatus having the image sensor, wherein the control unit is configured to, responsive to the acquired center position of the image circle of the lens apparatus shifting from a first lens position to a second lens position, set an initial center shift position and a shiftable range of the image stabilization control at:

(i) a first sensor position which is a first distance from the second lens position when the image stabilization apparatus is in the first state, and (ii) a second sensor position which is a second distance from the second lens position when the image stabilization apparatus is in the second state, wherein the first distance is larger than the second distance.

20. The image stabilization apparatus according to claim 1, wherein in a case where the acquired center position of the image circle shifts from the first lens position to the second lens position, the control unit controls the center position of the image stabilization control so that the center position of the image stabilization control is moved toward the second lens position by an amount smaller in a case where the current state is determined to be the first state than in a case where the current state is determined to be the second state.

* * * * *